(12) United States Patent
Grunow et al.

(10) Patent No.: US 7,706,140 B2
(45) Date of Patent: Apr. 27, 2010

(54) PORTABLE DATA TERMINAL INTERNAL SUPPORT STRUCTURE

(75) Inventors: Jonathan T. Grunow, Indian Trail, NC (US); Larry Keith Hooks, Jr., Fort Mill, SC (US)

(73) Assignee: Hands Held Products, Inc., Skaneateles Falls, NY (US)

( * ) Notice: Subject to any disclaimer, the term of this patent is extended or adjusted under 35 U.S.C. 154(b) by 373 days.

(21) Appl. No.: 11/935,443

(22) Filed: Nov. 6, 2007

(65) Prior Publication Data

US 2009/0091886 A1 Apr. 9, 2009

Related U.S. Application Data

(60) Provisional application No. 60/977,485, filed on Oct. 4, 2007.

(51) Int. Cl.
*G06F 1/16* (2006.01)
(52) U.S. Cl. .............................. 361/679.56; 235/472.01
(58) Field of Classification Search ............ 361/679.55, 361/679.56
See application file for complete search history.

(56) References Cited

U.S. PATENT DOCUMENTS

| | | | | |
|---|---|---|---|---|
| 5,107,100 A | * | 4/1992 | Shepard et al. | ........ 235/472.01 |
| 5,410,141 A | | 4/1995 | Koenck et al. | |
| 5,530,619 A | * | 6/1996 | Koenck et al. | ............ 361/679.3 |
| 5,710,728 A | * | 1/1998 | Danielson et al. | ............ 713/321 |
| D398,002 S | | 9/1998 | Chacon et al. | |
| 5,831,819 A | * | 11/1998 | Chacon et al. | ......... 361/679.56 |
| 6,266,685 B1 | | 7/2001 | Danielson et al. | |
| 6,421,234 B1 | * | 7/2002 | Ricks et al. | ............ 361/679.56 |
| D494,593 S | | 8/2004 | Wulff et al. | |
| 6,832,729 B1 | * | 12/2004 | Perry et al. | ............ 235/472.01 |
| 6,842,336 B2 | * | 1/2005 | Schremmer et al. | .... 361/679.56 |
| 6,913,201 B1 | * | 7/2005 | Wagner et al. | ......... 235/472.01 |
| 7,040,540 B2 | * | 5/2006 | Knowles et al. | ........ 235/462.14 |

OTHER PUBLICATIONS

U.S. Appl. No. 29/248,007, filed Jul. 25, 2006, Grunow, et al.
U.S. Appl. No. 29/248,008, filed Jul. 25, 2006, Dorr, et al.
U.S. Appl. No. 29/264,860, filed Aug. 21, 2006, Conti, et al.
U.S. Appl. No. 11/273,235, filed Nov. 14, 2005, Hinson, et al.
U.S. Appl. No. 11/459,770, filed Jul. 25, 2006, Coleman, et al.

* cited by examiner

*Primary Examiner*—Lisa Lea-Edmonds
(74) *Attorney, Agent, or Firm*—Hiscock & Barclay, LLP

(57) ABSTRACT

A portable data terminal comprising a circuit board which supports and interconnects a plurality of electrical components, a display, an angled frame which maintains the display at an angle to the circuit board, and a bracket which extends across the angled frame. The angled frame engages a peripheral portion of a first side of the circuit board. The bracket engages the circuit board so as to reduce the flexure of, and secure at least one electrical component on the circuit board.

18 Claims, 11 Drawing Sheets

PORTABLE DATA TERMINAL INTERNAL SUPPORT STRUCTURE

RELATED APPLICATION

This application claims the benefit of provisional application Ser. No. 60/977,485 filed Oct. 4, 2007.

BACKGROUND OF THE INVENTION

Portable data terminals (PDTs) are a type of data collection device used to collect, interpret, process, and ultimately transfer data to a larger data processing system. PDTs generally comprise a mobile computer, a keypad, and a data acquisition device. The mobile computer generally comprises a hand held (or "pocket") computing device, such as those available from INTEL, PALM, HEWLETT PACKARD, and DELL. Keypads come in a variety of alpha-numeric and numeric configurations. The data acquisition device generally comprises a device that captures data from, for example, radio frequency IDs (RFID), images, and bar codes. Data may also be captured via keypad entry and utilization of a touch panel associated with the mobile computer. PDTs are available from several sources, including HAND HELD PRODUCTS, INC.

Most PDTs are ruggedized to one extent or another for use in industrial environments. The tougher the environment, the more robust the PDT must be. For example, a PDT used in the transportation industry generally needs to be robust enough to continue functioning after numerous falls to concrete from a height of five feet or less. A major factor affecting the ability of PDTs to withstand such impacts is how well the internal components are packed within the body of the device. Unsupported, or inadequately supported, components may subject the PDT internal components to potential damage. However, certain components may also fail due to being too rigidly supported.

An additional area in which PDTs distinguish themselves is ergonomics. PDTs are designed to be used as a tool for data gathering and may be utilized by workers for extended periods of time. In many use cases, there is substantial value in providing an ergonomically acceptable device which is comfortable to use and does not contribute to a workers fatigue. A major challenge in designing PDTs is to incorporate ergonomic features into a rugged housing.

U.S. Pat. No. 5,410,141 discloses a hand held PDT having a substantially flat design, termed a bar design. FIG. 2 from U.S. Pat. No. 5,410,141 illustrates the advantage of a bar design in allowing the internal components to be arranged and tightly packed within the body of the PDT. The bar design facilitates the bracing of one component by another, such as a lower circuit board pressing against and stabilizing a higher keyboard or display. However, such a configuration may be ergonomically undesirable in certain use cases, such as retail environments wherein a user is often repeatedly scanning merchandise. In particular, the user must bend their wrist or elbow to view the display of a bar shaped PDT. It is to be noted that the PDT disclosed in U.S. Pat. No. 5,410,141 has an external antenna which is much more susceptible to damage in drops than an internal antenna.

U.S. Design Pat. USD 494,593 illustrates a hand held PDT having a substantially flat design and also incorporating a handle. The PDT also incorporates an internal antenna into its design which allows for better protection of the antenna and a more robust PDT. However, there is no room on the PDT to mount the antenna on the top side of the device. The antenna must be mounted on the bottom side of the device, or in the handle. Mounting the antenna in either of these locations may cause problems with signal communication to transmitters and from receivers that are most often located in ceilings or high on walls. Additionally, mounting the antenna in either of these locations subjects the antenna to increased bio-interference from the PDT user and exposes the PDT user to increased radiation.

U.S. Design Pat. USD 398,002 illustrates that angled displays are known in the prior art. An angled display may be more ergonomically friendly for certain use cases in that the user may view the screen more easily without excessively bending their wrist or elbow. However, angled displays typically result in a less durable and less robust PDT.

Hence, there exists an unsatisfied need for a portable data terminal with a more ergonomically friendly display, with an internal antenna positioned on the top side of the portable data terminal, and a method of securing the PDT's internal components.

BRIEF DESCRIPTION OF THE DRAWINGS

An understanding of the present invention can be gained from the following detailed description of one or more embodiments of the invention, taken in conjunction with the accompanying drawings of which.

DETAILED DESCRIPTION

Reference will now be made in detail to the present invention, examples of which are illustrated in the accompanying drawings, wherein like numerals indicate like elements. The following description will use nomenclature associated with a PDT, however those of ordinary skill in the art will recognize that the present invention is applicable to a variety of other portable devices including, but not limited to, personal data assistants (PDAs), bar code scanners, consumer electronics (including portable radios, televisions, and phones), and the like. It is anticipated that many such portable devices would benefit from the present invention, including the embodiments thereof described herein.

Figure 1:
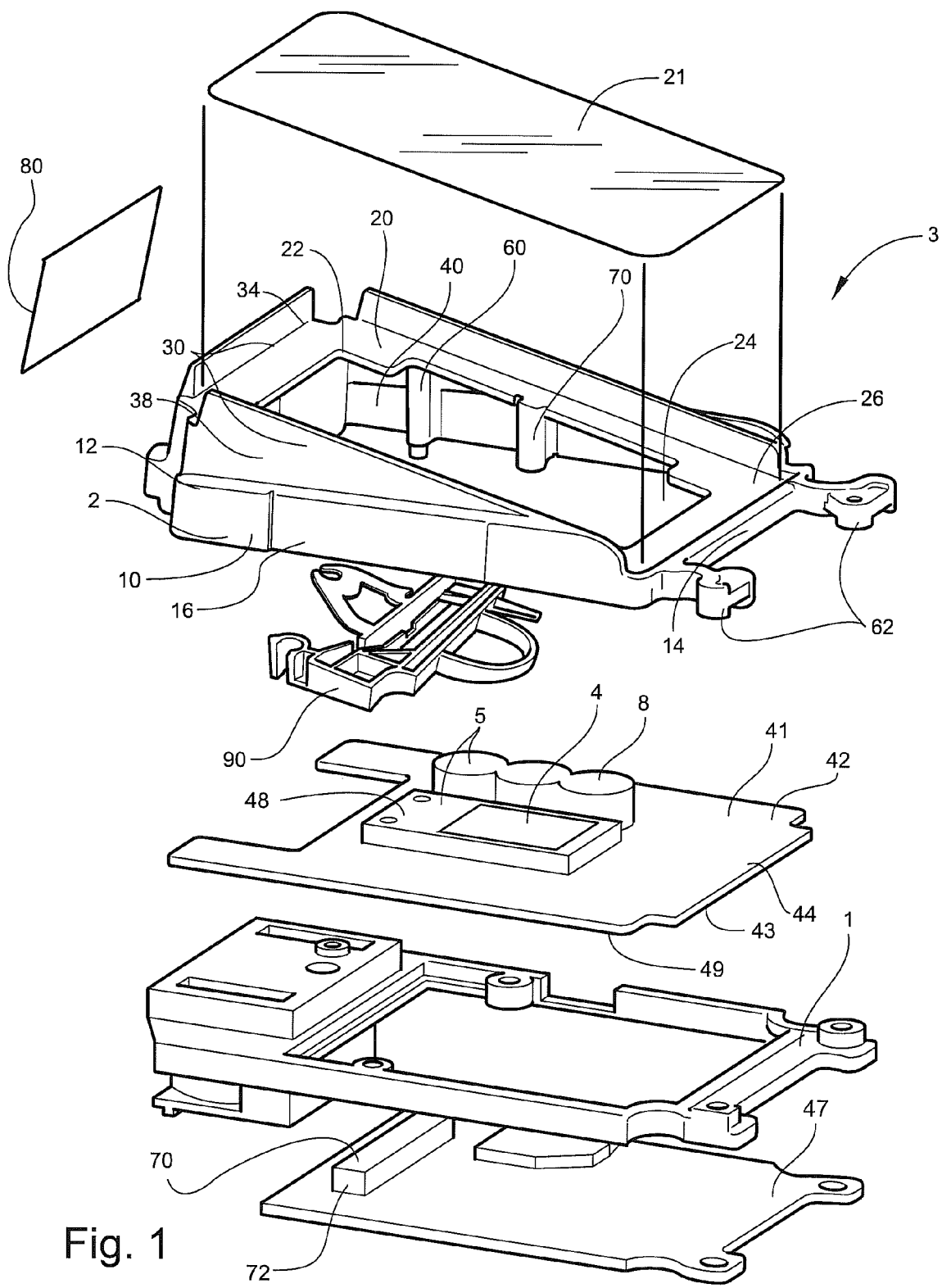
FIG. 1 is an exploded view of an angled frame and other components.
Figure 7:
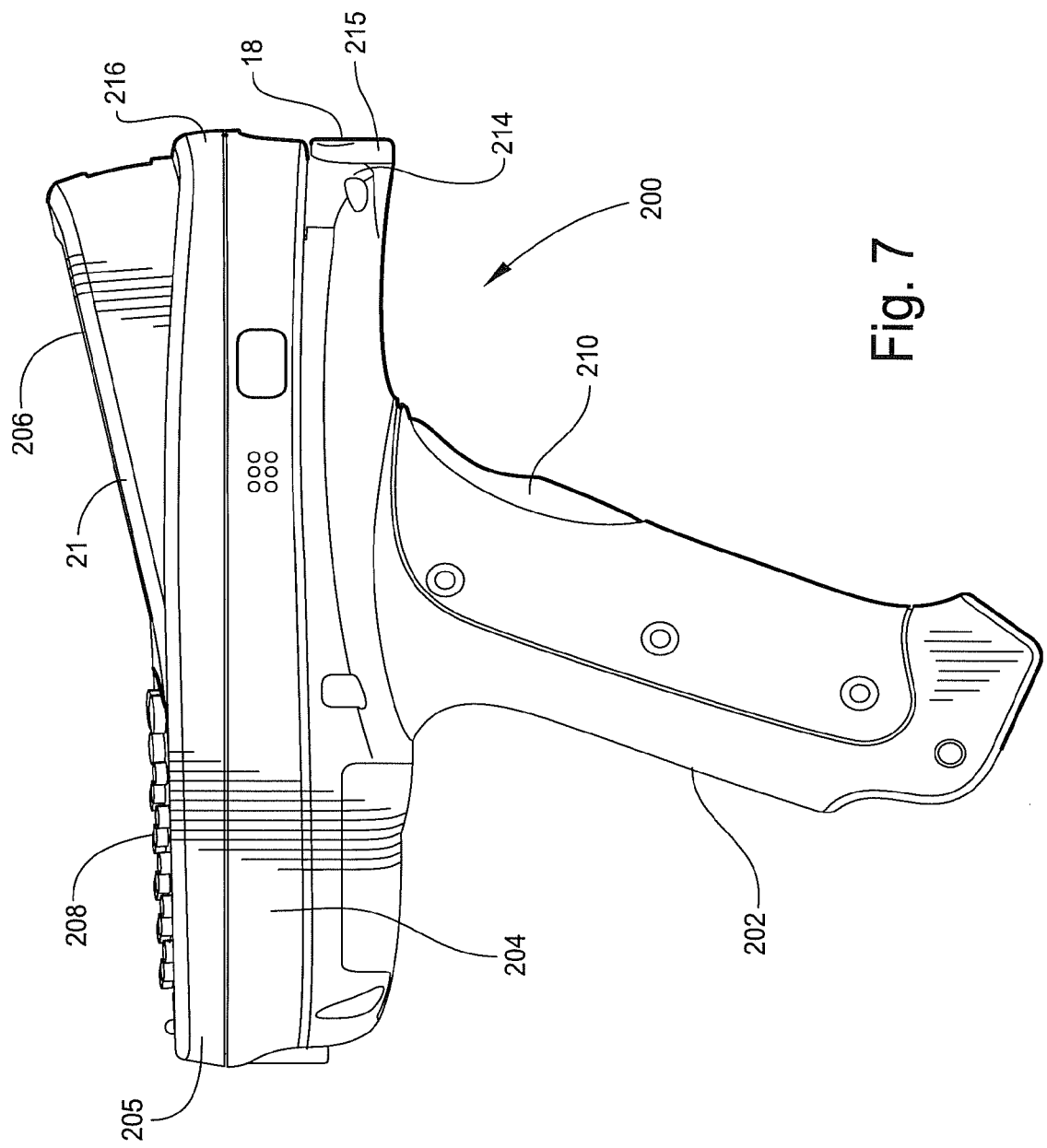
FIG. 7 is a profile view of a PDT with an angled display.

Looking at FIG. 7, there is shown an embodiment of a portable data terminal 200 illustrating the bottom housing 204 and the top housing 205 which surround an angled frame 2, FIG. 1. In one embodiment, the bottom housing 204 and the top housing 205 are connected through the angled frame 2. In another embodiment, the bottom housing 204, the top housing 205, and the angled frame 2 are held together by any means capable of satisfying the testing method MIL STD 810F, Method 516.5, Procedure IV. In another embodiment, the bottom housing 204, the top housing 205, and the angled frame 2, are held together with screws. In still another embodiment, the angled frame 2 is held together with screws.

Figure 2:
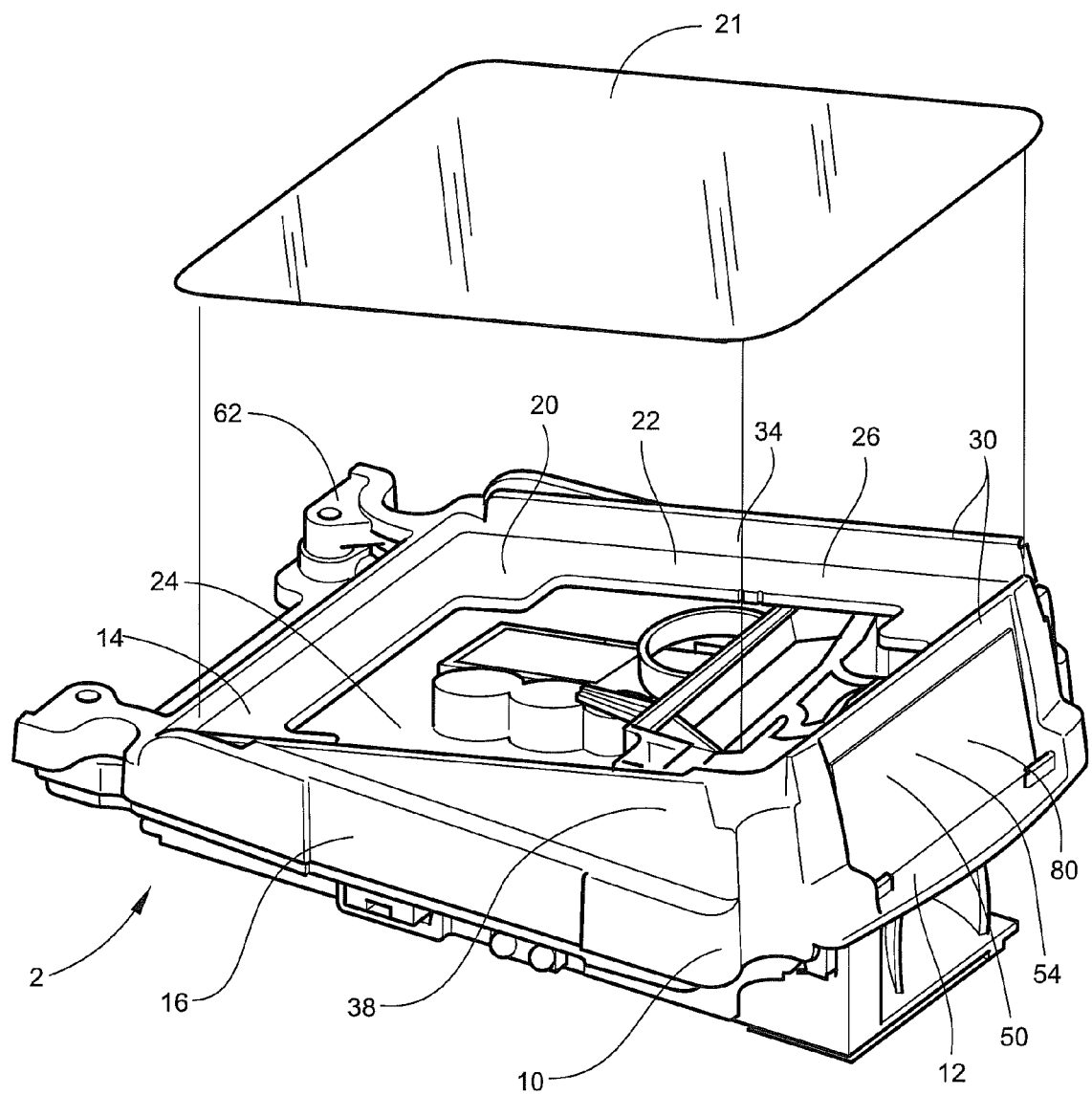
FIG. 2 is a perspective view of the angled frame, bracket, and the antenna cavity.

FIGS. 1 and 2 illustrate an embodiment of the present invention as a display 21, an angled frame 2, an open space 40, a bracket 90, and a circuit board 41. In one embodiment of the present invention, the angled frame 2 holds the display 21 at an angle, and the angled frame 2 thereby creates the open space 40. The angle of the angled frame 2/display 21 is in the range of 10 to 20 degrees. The bracket 90 may be semi-flexible to partially rigid and is mounted between the angled frame 2 and the circuit board 41 through the open space 40 where the upper contact points of the bracket 90 engage the angled frame 2 and the lower contact points of the bracket 109, 119 engage the circuit board 41. In one embodiment of the present invention, the bracket 90 is not rigid, as it has been found that a semi-flexible to partially rigid bracket 90 capable of some degree of deformation provides superior performance in providing the necessary support while also allowing for the necessary give thereby satisfying the testing method MIL STD 810F, Method 516.5, Procedure IV. FIG. 1 also illustrates one embodiment of the present invention having a frame 1 and a circuit board 47.

In another embodiment, the above embodiment further includes the angled frame 2 having an interior surface 34 and an exterior surface 38. An antenna cavity 50 exists on the exterior surface 38 which has an auxiliary opening 54 through both the antenna cavity and the angled frame 2. An antenna 80 is mounted within the antenna cavity 50. In one embodiment, the antenna is a patch antenna.

In still another embodiment, the above embodiment further includes a plurality of solid posts 60 and/or a plurality of hollow posts 62 emanating from the angled frame 2. The hollow posts 62 are threaded. A first molded slot 92 is connected to a first end member 120 of the bracket 90 and a second molded slot 94 is connected to a second end member 125 of the bracket 90. The first molded slot 92 and second molded slot 94 are then engaged to one or more of the plurality of solid posts 60 and/or a plurality of hollow posts 62 to secure the bracket 90 to the angled frame 2.

FIGS. 1 and 2 also illustrate another embodiment of the present invention wherein a portable data terminal 200 comprises a circuit board 41 which supports and interconnects a plurality of electrical components 5, a display 21, an angled frame 2 that maintains the display 21 at an angle relative to the circuit board 41. The angled frame 2 engages a peripheral portion 44 of a first side 42 of the circuit board 41. A bracket 90 extends across the angled frame 2 and engages the circuit board 90 to reduce the circuit board's flexure and to secure at least one electrical component 7 mounted on the circuit board 41. In another embodiment, the at least one electrical component 7 is at least two electrical components.

The one electrical component 7 or the plurality of electrical components 5, as used herein, may include, but are not limited to, a battery 8, a removable printed circuit board 48, an elongated electrical component 70, a wireless communication circuit, a terminal, a connector 72, a wire, a lead 82, a cord, a cable, a switch, a resistor, a capacitor, a fuse, an inductor, a power source, a transducer, a sensor, a detector, a network, a diode, a transistor, an integrated circuit, a hybrid circuit, an assembly, a module, a printed circuit board, or combinations thereof.

Printed circuit board, as used herein, refers to an electronic device used to mechanically support and electrically connect electronic components using conductive pathways, or traces, etched from copper sheets laminated onto a non-conductive substrate. The printed circuit board may be used alone, or populated with electronic components, such as those listed above.

Figure 8:
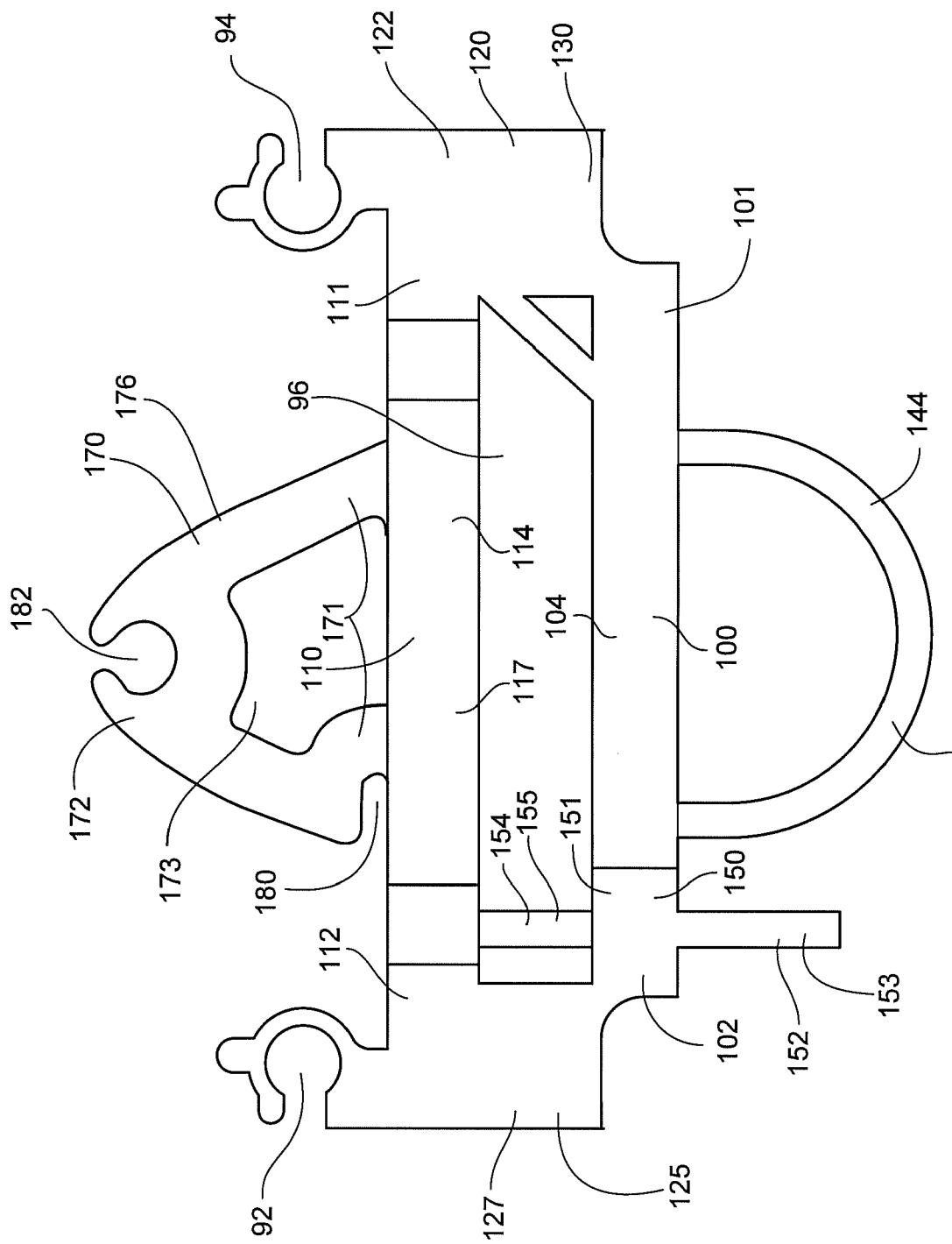
FIG. 8 is a downward view of a bracket.
Figure 9:
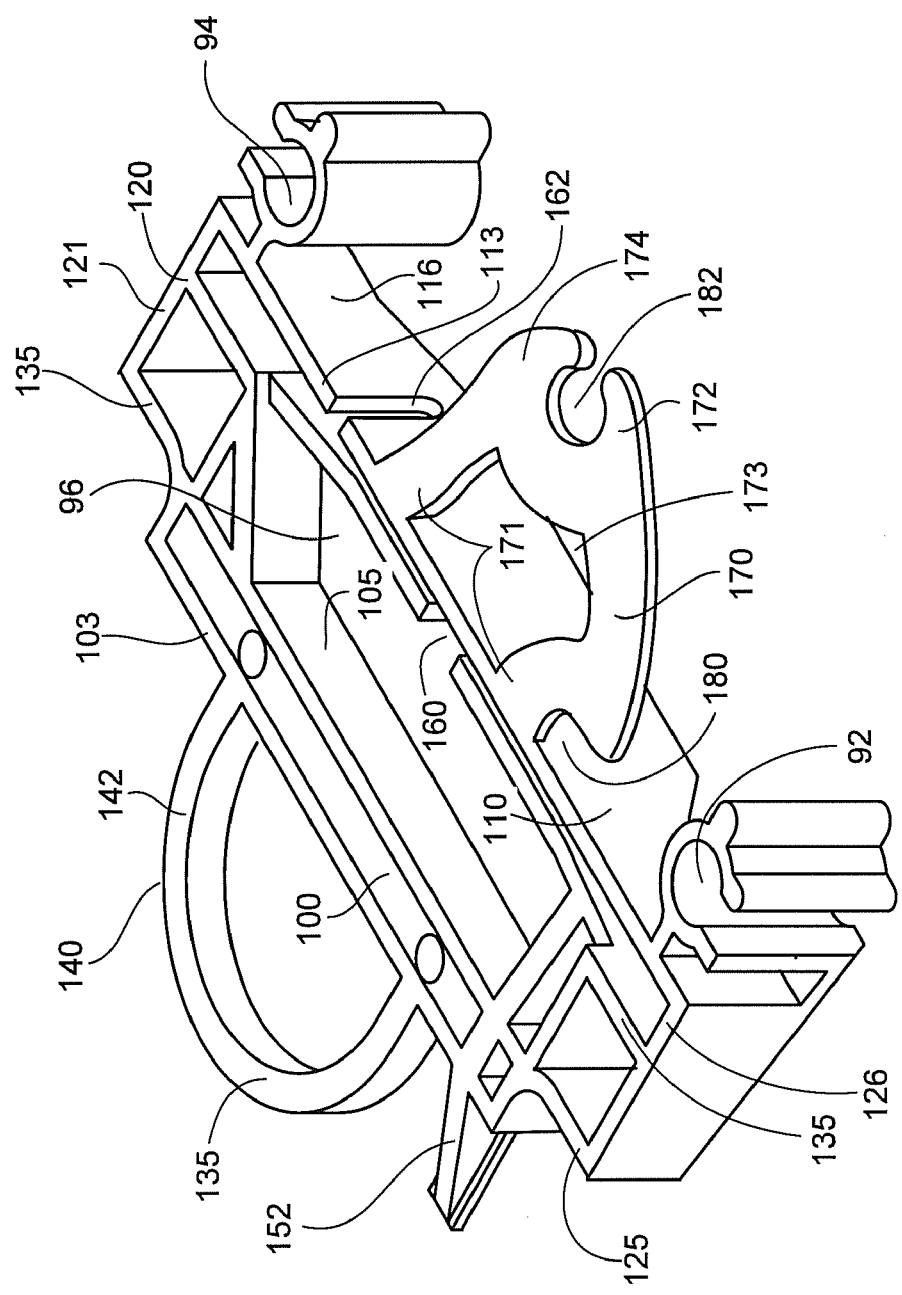
FIG. 9 is a perspective view of a bracket.
Figure 10:
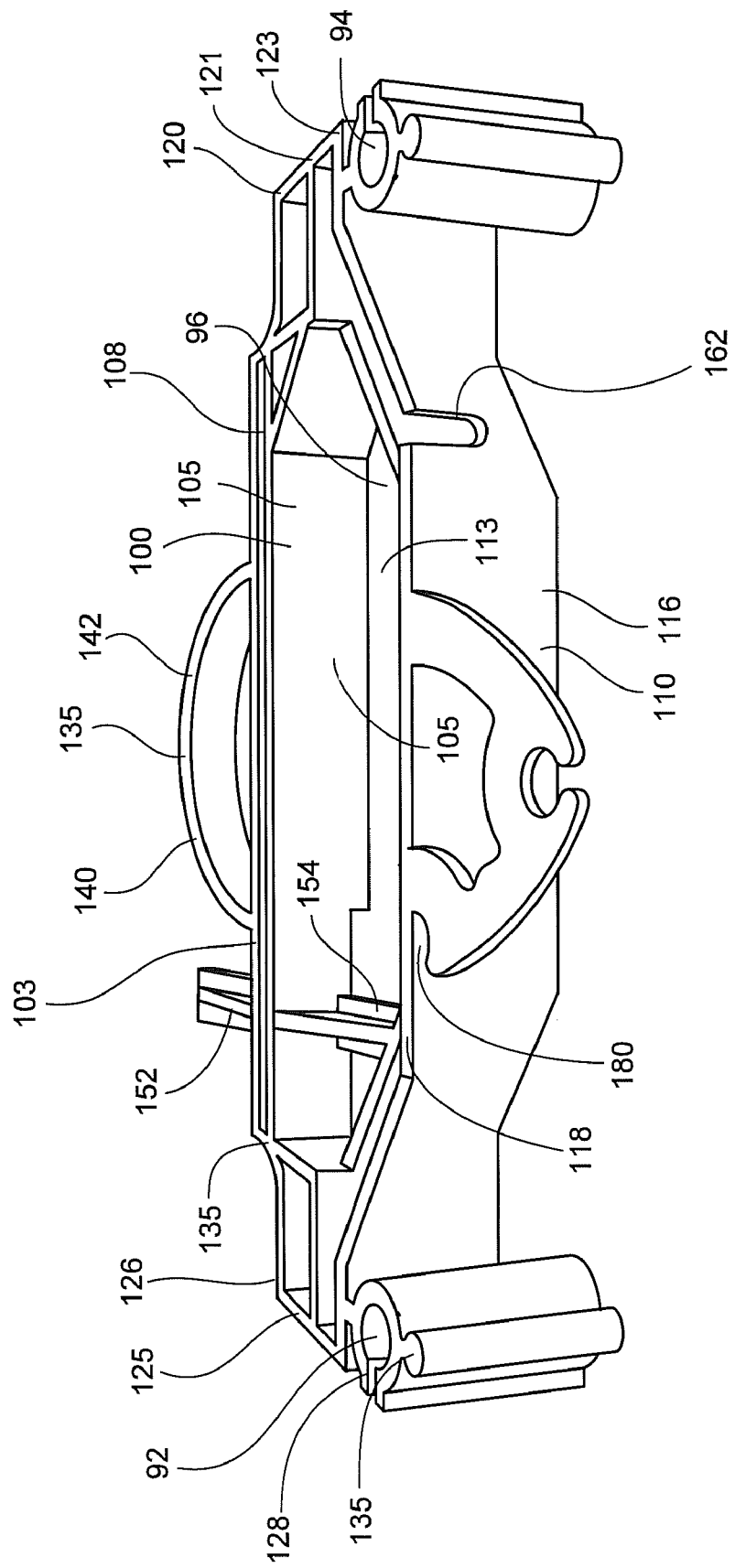
FIG. 10 is a side view of a bracket.
Figure 12:
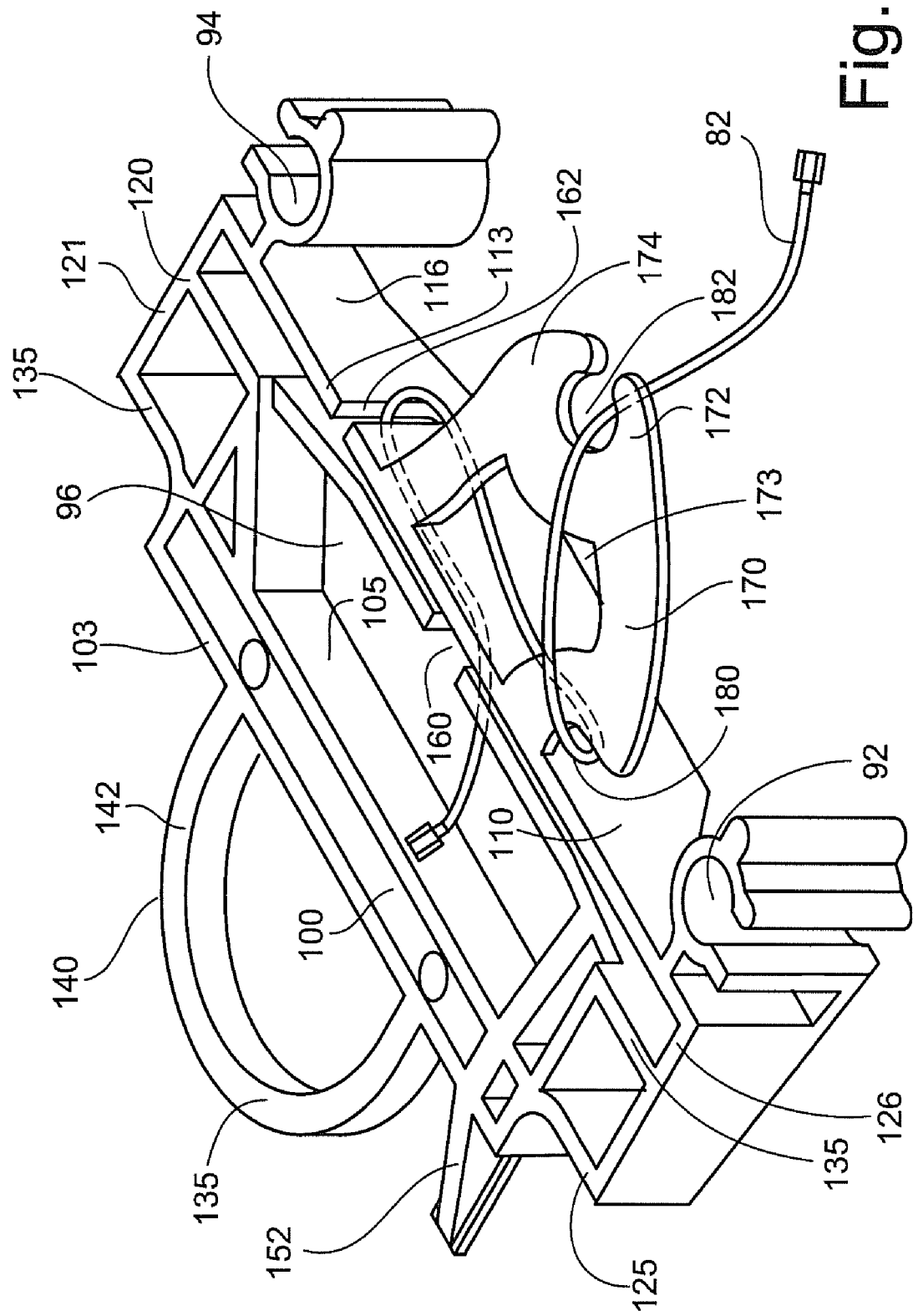
FIG. 12 is a perspective view of a bracket and a wire/lead.

In another embodiment, the above embodiment further includes an antenna 80 which is supported by an exterior surface 38 of the angled frame. The antenna 80 may be a patch antenna. In still another embodiment, the bracket 90 in the above embodiment further includes an extension 170 (FIG. 8) to facilitate the repeatable routing of a wire 82 (FIG. 12) connecting the antenna 80 to the circuit board 41. In still another embodiment, the angled frame 2 in the above embodiment further includes at least one solid post 60. The bracket 90 slideably engages with one or more of the posts 60 so as to orient the bracket 90 with the angled frame 2. In still another embodiment, the angle of the angled frame 2 in the above embodiment is in the range of 10 to 20 degrees.

In still another embodiment, one of the plurality of electrical components 5 is an elongated electrical component 70, and the bracket 90 reduces the flexure of the circuit board 41 near the elongated electrical component 70. In one embodiment, the elongated electrical component 70 may be a connector 72. In another embodiment, the elongated electrical component 70 is mounted on an opposite side 49 of the circuit board 41 from the bracket 90. In still another embodiment, the portable data terminal described above further comprises a frame 1 engaging a peripheral portion of a second side 43 of the circuit board. The bracket 90 biases the circuit board 41 against the frame 1.

In another embodiment of the present invention, a portable data terminal comprises a dataform reader 18, a display 21, an antenna 80, a circuit board 41, a housing 203, and an angled frame 2. The antenna 80 is a patch antenna. The circuit board 41 supports and interconnects a plurality of electrical components 5. The housing 203 supports the dataform reader 18, the display 21, and the antenna 80. A bottom housing section 204 and a top housing section 205 form the housing 203, at least partially. The bottom housing section 204 has a front surface 214 with an opening 215 utilized by the dataform reader. The top housing section 205 has a front surface 216 that mates with the front surface of the bottom section 214. The angled frame 2 maintains the display 21 at an angle to the circuit board 41 so that the display 21 is closer to the circuit board at a first end 14 of the angled frame than at a second end 12 of the angled frame. The second end 12 of the angled frame supports the antenna 80 so that a major plane of the antenna 80 is approximately parallel with the front surface of the top section of the housing 203.

In another embodiment, the above embodiment further comprises a bracket 90 extending across the angled frame 2 and engaging the circuit board 41 so as to reduce the flexure of the circuit board 41 and secure at least one electrical component 5 on the circuit board. In another embodiment, wherein one of the plurality of electrical components 5 of the above embodiment is an elongated electrical component 70, the bracket reduces the flexure of the circuit board near the elongated electrical component 70.

FIGS. 1 and 2 also disclose another embodiment wherein the angled frame 2 is comprised of a base 10, a display cavity 20, a bracket 90, and an antenna cavity 50. The angled frame 2 may be comprised of any material durable enough to remain functionally intact after numerous falls from a height of five feet or less. Suitable angled frame materials include, but are not limited to, metal, non-metal, or combinations thereof. Suitable metals include, but are not limited to, steel, carbon steel, aluminum, copper, nickel, tin, titanium, manganese, magnesium, beryllium, and combinations thereof. Suitable non-metals are generally polymers or plastics. Examples of plastics include, but are not limited to, polyethylene, polypropylene, polybutylene, polyethylene terephthalate, polycarbonate, poly vinyl chloride, and combinations thereof. If polyethylene or polypropylene is used, it is preferably a high density or an ultra high density polymer. In one embodiment of the present invention, the angled frame 2 is made from magnesium. In yet another embodiment, the angled frame 2 satisfies the requirements of the testing method MIL STD 810F, Method 516.5, Procedure IV, while encased within a housing 203. In still another embodiment, an angled frame 2 satisfies the requirements of the testing method MIL STD 810F, Method 516.5, Procedure IV, with the alteration of dropping the portable data terminal from a height of five feet (instead of four feet) approximately 24 times onto concrete. In still another embodiment, the portable data terminal 200 satisfies the requirements of the testing method MIL STD 810F, Method 516.5, Procedure IV, with the alteration of dropping the portable data terminal from a height of five feet (instead of four feet) approximately 24 times onto concrete.

A base 10 provides a stable platform on which the remainder of the angled frame is constructed. The base 10 has a first end 14, a second end 12, and base sides 16. The base 10 may include a rim 22, a plurality of molded walls 30, a plurality of solid posts 60, and a plurality of hollow posts 62. The rim 22 may emanate inwards from the base 10. The rim 22 may define a bottom 26. The bottom 26 comprises the display cavity 20 and the rim 22. Additionally, the rim 22 may emanate from the molded walls 30 as illustrated in FIGS. 1 and 2.

As illustrated in FIGS. 1 and 2, a plurality of molded walls 30 angularly emanate from the base 10. In one embodiment of the present invention, the molded walls 30 emanate further from the second end 12 than from the first end 14 and emanate increasingly on the base sides 16 to create an angled display cavity 20. The plurality of molded walls 30 may define the outside boundary of the display cavity 20. The molded walls 30 have an interior surface 34 and an exterior surface 38. The angularly emanating molded walls 30 create space for placement of one or more antennas 80.

The antenna cavity 50 may be located in or on one or more of the molded walls 30 emanating from the base 10. For example, the antenna cavity 50 may be located in the exterior surface 38 of one or more of the molded walls 30. In one embodiment of the present invention, the antenna is placed on a PDT's top side to facilitate better communication with transmitters and receivers which may be located in the walls and/or ceiling. In another embodiment, the antenna is placed as far from the user as possible to decrease the amount of bio-interference. In yet another embodiment, two or more antennas are used.

Figure 6:
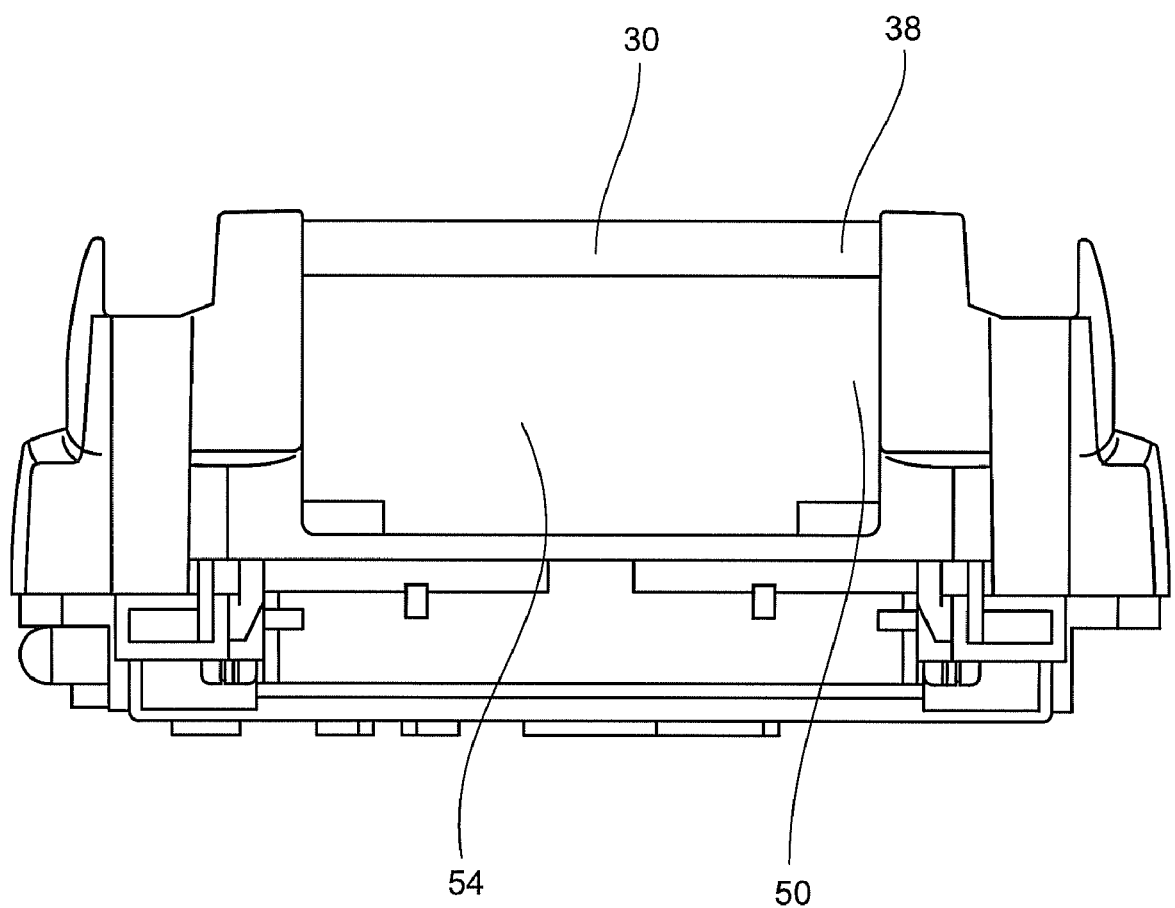
FIG. 6 is a frontward view of the angled frame and the antenna cavity.

FIGS. 2 and 6 illustrate one potential embodiment of the present invention where the antenna cavity 50 is embedded in the exterior surface 38 of the molded wall 30 located at the second end 12 of the angled frame 2. An auxiliary opening 54 may exist through the molded wall 30 of the antenna cavity 50, as illustrated in FIG. 6. The antenna 80 is mounted within the antenna cavity 50. In one embodiment of the present invention, both the antenna cavity 50 and the antenna 80 are made as large as possible for improved transmission and reception. The antenna 80 may be comprised of any material durable enough to remain functionally intact after numerous falls from a height of five feet or less. Suitable antenna 80 materials include, but are not limited to, metal, non-metal, or combinations thereof. In one embodiment, the antenna 80 satisfies the requirements of the testing method MIL STD 810F, Method 516.5, Procedure IV.

In one embodiment of the present invention, the antenna 50 is a patch antenna. A patch antenna is a narrowband, wide-beam antenna fabricated by etching the antenna element pattern in metal trace bonded to an insulating substrate (the conductor). A patch antenna consists mainly of a conductor mounted over a groundplane. The conductor and ground plane are separated with a material including, but not limited to, air, ceramic material, and combinations thereof. Patch antennas are suitable in this application because they have a low profile, are mechanically rugged, inexpensive to manufacture, and are easily conformed into desired mounting locations.

Additional processing of the data may take place on the PDT 200 and/or a data processing source to which the data is transmitted via any available transport mechanism on the PDT 200. Some examples of known transport mechanisms utilized by PDT's include, but are not limited to: Bluetooth, WiFi, GSM, CDMA, USB, IrDA, removable FLASH memory, parallel and serial ports (including for example, RS-232).

The PDT 200 may further include a plurality of wireless communication links such as an 802.11 communication link, an 802.16 communication link, a link for communication with a cellular network such as a network in accordance with the Global System for Mobil Communications (GSM), in IR communication link, and a Bluetooth communication link. Each of these links facilitates communication with a remote device and may be used to transfer and receive data.

The plurality of solid posts 60 emanate from the base 10. In one embodiment of the present invention illustrated in FIGS. 3 and 4, the solid posts 60 emanate downwardly from the base 10. In another embodiment, the solid posts 60 may emanate in any direction from the base 10. The solid posts 60 may have a shape selected from the group consisting of rectangle, square, circle, semicircle, triangle, oblong, oval, tetrahedral, trapezoid, diamond, cone, or combinations thereof.

The plurality of hollow posts 62 emanate from the base 10. In one embodiment of the present invention illustrated in FIGS. 3 and 4, the hollow posts 62 emanate downwardly from the base 10. In another embodiment, the hollow posts 62 may emanate in any direction from the base 10. The hollow posts 62 may have a shape selected from the group consisting of rectangle, square, circle, semicircle, triangle, oblong, oval, tetrahedral, trapezoid, diamond, or combinations thereof. The hollow posts 62 may be used to secure the angled frame 2 to the bottom housing 204 and/or the top housing 205 of a PDT (See FIG. 7). In one embodiment of the present invention, the hollow posts 62 are threaded to accept screws or bolts. In another embodiment of the present invention, the hollow posts 62 are smooth to allow a fastener to pass through.

FIG. 7 is a profile view of a PDT 200 which incorporates a bottom housing 204, a top housing 205, and a handle 202. The top housing 205 incorporates both a keypad 208 and a touch panel 206. The touch panel 206 illustrated in FIG. 7 is angled to provide easier viewing and functionality for the user of the PDT 200. The angled touch panel 206 also provides a space to secure an antenna 80. The handle 202 extends from a bottom surface of the bottom housing 204 thereby facilitating a pistol like grip. The handle 202, may incorporate a trigger 210 and may incorporate other features such as a receptacle for receiving and retaining a stylus for activation of the touch panel 206.

When the touch panel 206 is angled, such as the one illustrated in FIG. 7, it creates an open space 40 beneath the touch panel which requires support within the bottom housing 204 and the top housing 205 of the PDT 200. This support may come from an angled frame 2 which is seated internally in the PDT 200. The angled frame 2 may provide a display cavity 20, an antenna cavity 50, and a means to stabilize one or more circuit boards 41.

Figure 3:
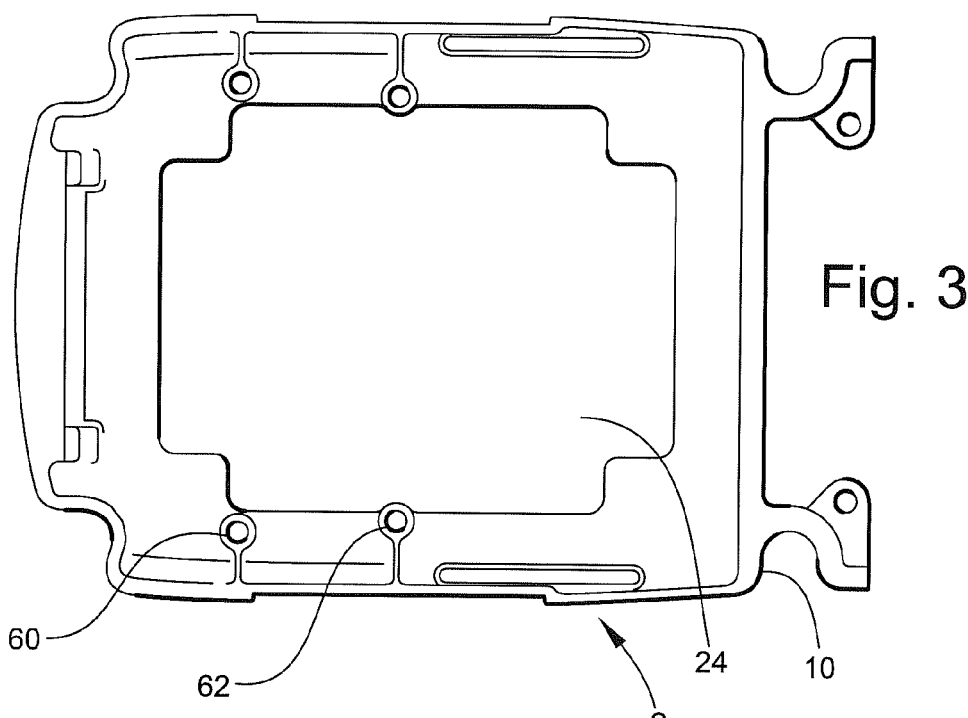
FIG. 3 is an upward view of the angled frame without the bracket.
Figure 4:
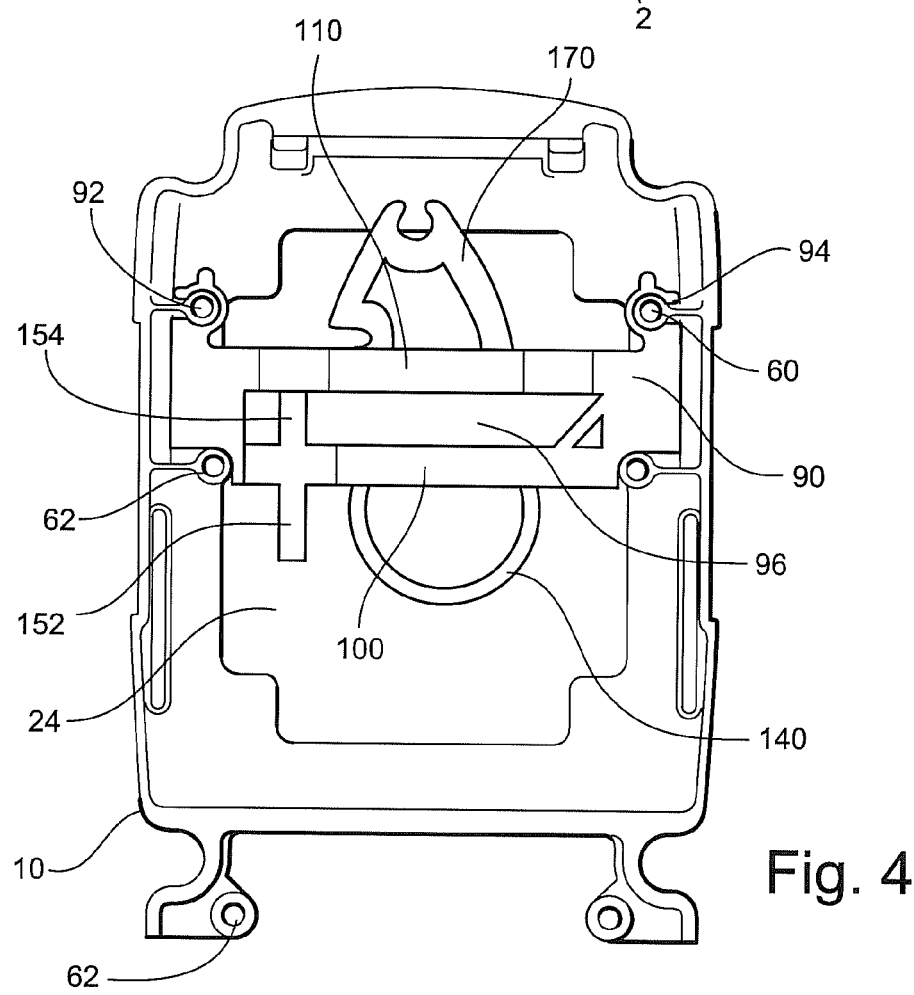
FIG. 4 is an upward view of the angled frame with the bracket.
Figure 5:
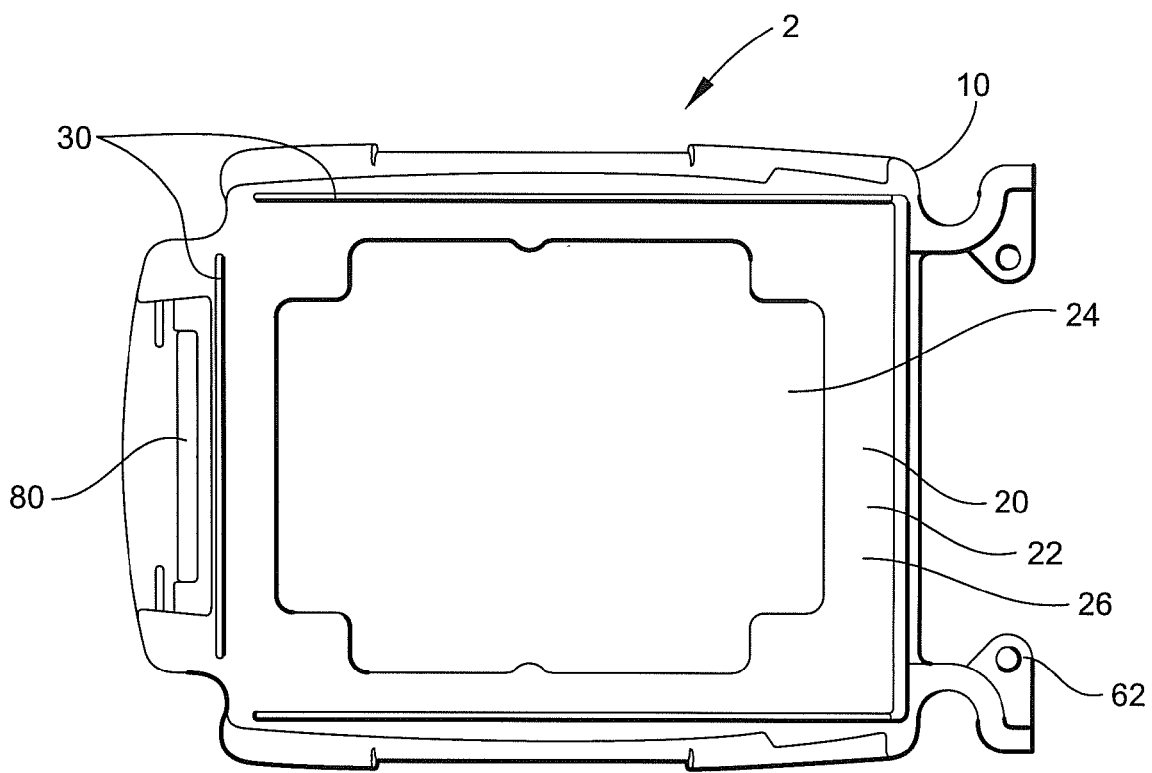
FIG. 5 is a downward view of the angled frame and the antenna cavity without the bracket.

The display cavity 20 is set at an angle and angularly emanates from the base 10. The angle of the display cavity 20 is in the range of 10 to 20 degrees. The rim 22 and the accessory opening 24 define the bottom 26 of the display cavity 20. The display cavity 20 may be defined on its sides by the plurality of molded walls 30 emanating from the base 10. FIGS. 3, 4, and 5 illustrate one embodiment of the present invention clearly displaying an accessory opening 24 through the bottom 26 of the display cavity 20.

The bracket 90 (FIGS. 1, 2, 4, 8, 9, 10, 11, and 12) works in conjunction with the angled frame 2. The bracket 90 is generally comprised of a first beam 100, a second beam 110, a first end member 120, a second end member 125, and a bracket opening 96. The first beam 100 is comprised of a first end 101, a second end 102, an upper surface 103, a lower surface 104, an inner surface 105, an outer surface 106, an upper contact point 108, and a lower contact point 109. The second beam is comprised of a first end 111, a second end 112, an upper surface 113, a lower surface 114, an inner surface 115, an outer surface 116, a center section 117, an upper contact point 118, and a lower contact point 119. The first end member 120 is connected to the first end of the first beam and the first end of the second beam and has an upper surface 121 and a lower surface 122. A first molded slot 92 is connected to the first end member 120. The second end member 125 is connected to the second end of the first beam and the second end of the second beam and has an upper surface 126 and a lower surface 127. A second molded slot 94 is connected to the second end member 125. The lower surface of the first beam 104, the lower surface of the first end member 122, the lower surface of the second end member 127, the first end of the second beam 111 and the second end of the second beam 112 define a first plane 130. The upper surface of the first beam 103, the upper surface of the first end member 121, the upper surface of the second end member 126, and the second beam upper contact point 118 define a second plane 135. The second plane is at an angle to the first plane. In one embodiment, the angle of the second plane 135 to the first plane 130 is in the range of 10 to 20 degrees. A bracket opening 96 is defined by the inner surface of the first beam 105, the inner surface of the second beam 115, the first end member 120, and the second end member 125.

In one embodiment of the present invention, the first beam 100, the first end member 120, the second end member 125, and the second beam 110 each comprise a cavity in their upper surfaces, respectively.

The embodiment described above may comprise additional structures including a U-shaped support 140 (FIGS. 8, 9, 10, 11, and 12) connected to the outer surface of the first beam 106. The U-shaped support 140 has an upper surface 142 and a lower surface 144. In one embodiment, the upper surface of the U-shaped support 142 is in the first plane 130. In another embodiment, lower surface of the U-shaped support 144 is in the second plane 135. In yet another embodiment, the lower surface of the U-shaped support 144 is configured to contact a computer chip 4. In yet another embodiment, the lower surface of the U-shaped support 144 is configured to contact a computer chip 4 mounted on the circuit board 41.

Figure 11:
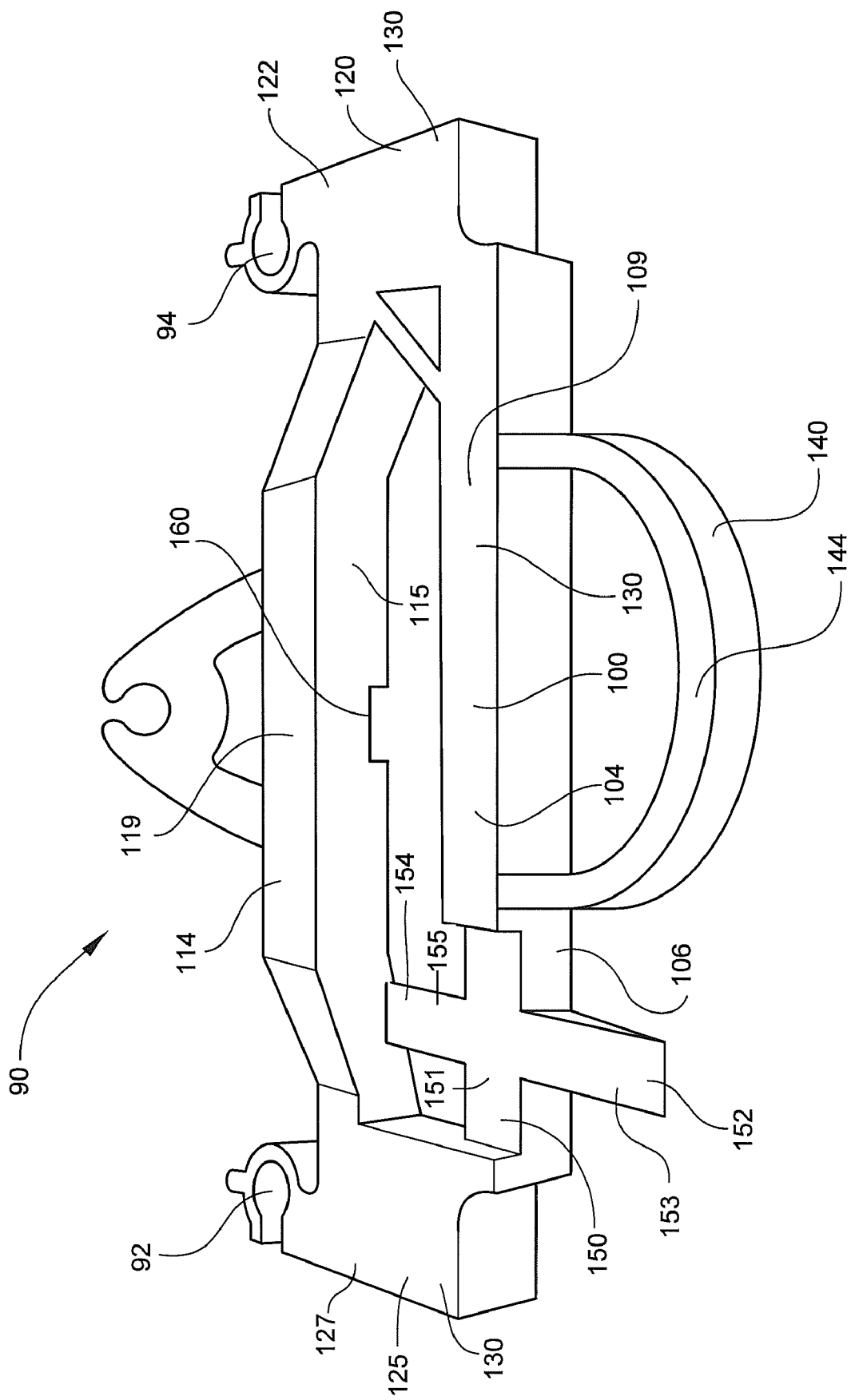
FIG. 11 is a side/perspective view of a bracket.

The embodiments described above may comprise additional structures including a first notch 150 on the lower surface of the first beam 104 beside the U-shaped support 140 (FIG. 11). The first notch 150 has a lower surface 151 which is below and substantially parallel to the lower surface of the first beam 104. There is a second notch 160 on the inner surface of the second beam 115 and a third notch 162 on the outer surface of the second beam 116. There is a first tab 152 connected to the outer surface of the first beam 106 which has a lower surface 153 at the same level as the lower surface of the first notch 151. There is a second tab 154 connected to the inner surface of the first beam 105 and the inner surface of the second beam 115 which passes through the bracket opening 96 and is spaced apart from the second end member 125. The second tab 154 has a lower surface 155 at the same level as the lower surface of the first notch 151. In one embodiment, the lower surface of the first notch 151, the lower surface of the first tab 153, and the lower surface of the second tab 155 are configured to contact a battery 8 on the circuit board 41.

The embodiments described above may comprise additional structures including an extension 170 (FIGS. 8, 9, 10, 11, and 12) which has an extension base 171, an extension tip 172, and an extension opening 173. The extension 170 connected at the extension base 171 to the outer surface of the second beam 116. The extension 170 has a fourth notch 180 located between the extension base and the outer surface of the second beam 116. The extension 170 has a fifth notch 182 located at the extension tip 172. The extension tip 172 has an upper surface 174 and a lower surface 176. In one embodiment, the lower surface of the extension tip 176 is in the second plane 135.

In one embodiment of the present invention, the bracket 90 is permanently attached to the angled frame 2. In another embodiment, the bracket 90 (FIG. 1) is separate and removable from the angled frame 2. One potential benefit of the bracket 90 is to decrease the need for screws in the PDT 200. In one embodiment, the bracket 90 (FIG. 1) is comprised of a first beam 100, a second beam 110, a first end member 120, and a second end member 125. The bracket 90 is arched to provide minimal contact with circuit boards and to provide for spring action. The spring action aids in circuit board stabilization.

In another embodiment, the bracket 90 is further comprised of a bracket opening 96, a second notch 160, and a third notch 162. (FIGS. 9 and 12) In one embodiment, the bracket opening 96, the second notch 160, and the third notch 162 provide a route for one or more wires/leads to travel within the PDT. (FIG. 12) In another embodiment, the bracket opening 96, the second notch 160, and the third notch 162 provides a route for a lead 82.

In yet another embodiment, the bracket 90 is further comprised of a hook emanating from the outer surface of the second beam 116, a first tab 152 emanating from the outer surface of the first beam 106, and a U-shaped support 140 emanating from the outer surface of the first beam 106. In one embodiment, the hook provides a route for one or more leads to travel within the portable data terminal 200. In another embodiment, the hook provides a route for a lead 82. In yet another embodiment, the first tab 152 is configured to contact a battery 8 on the circuit board 41. The first tab 152 aids in battery stabilization. In still another embodiment, the U-shaped support 140 is configured to contact a computer chip 4 on the circuit board 41. The U-shaped support 140 aids in computer chip stabilization.

The bracket 90 of the present invention may be comprised of any material durable enough to remain functionally intact after numerous falls from a height of five feet or less. Suitable bracket 90 materials include, but are not limited to, metal, non-metal, or combinations thereof. Suitable metals include, but are not limited to, steel, carbon steel, aluminum, copper, nickel, tin, titanium, manganese, magnesium, beryllium, and combinations thereof. Suitable non-metals are generally polymers or plastics. Examples of plastics include, but are not limited to, polyethylene, polypropylene, polybutylene, polyethylene terephthalate, polycarbonate, poly vinyl chloride, and combinations thereof. If polyethylene or polypropylene is used, it is preferably a high density or an ultra high density polymer. In one embodiment, the bracket 90 is made from plastic. The plastic may be a polycarbonate. In another embodiment of the present invention, the bracket 90 is not rigid, as it has been found that a semi-flexible to partially rigid bracket 90 capable of some degree of deformation provides superior performance in providing the necessary support while also allowing for the necessary give thereby satisfying the testing method MIL STD 810F, Method 516.5, Procedure IV. In yet another embodiment, the bracket 90 satisfies the requirements of the testing method MIL STD 810F, Method 516.5, Procedure IV.

Flexible, as used herein, refers to a material which is capable of yielding, bending, or giving without breaking. It also refers to a material which will yield to pressure and is not stiff or brittle.

The bracket 90 may engage the angled frame in a variety of ways. In one embodiment of the present invention, the bracket 90 may engage the angled frame 2 at the upper contact points of the first beam 108, the second beam 118, the first end member 123, and the second end member 128. In another embodiment, the bracket 90 may have a first molded slot 92 and a second molded slot 94 located at the first end member 120 and the second end member 125. The hollow molded slots 92 and 94 may have a shape selected from the group consisting of rectangle, square, circle, semicircle, triangle, oblong, oval, tetrahedral, trapezoid, diamond, or combinations thereof. In yet another embodiment the bracket 90 engages one or more of the solid posts 60. In yet another embodiment, the bracket 90 engages one or more of the hollow posts 62. FIG. 4 illustrates one embodiment of the present invention where the bracket 90 having a first molded slot 92 and a second molded slot 94 located at the first end member 120 and the second end member 125 engaged to a molded track 60 emanating downward from the base 10. In another embodiment, the bracket 90 may have a first molded slot 92 and a second molded slot 94 located at the first end member 120 and the second end member 125 engaged to a hollow molded track 62 emanating downward from the base 10.

The first beam lower contact point 109 of the bracket 90 secures/supports an electrical component 5 or a computer chip 4. The second beam lower contact point 119 of the bracket 90 engages and stabilizes a circuit board 41 within the PDT 200 to protect and maintain, among other things, the load connections on the circuit board 41. The first beam lower contact point 109 and the second beam lower contact point 119 may engage a circuit board 41 anywhere on the circuit board's surface to help stabilize the circuit board and hold it in place. In one embodiment of the present invention, the first beam lower contact point 109 and the second beam lower contact point 119 engage the circuit board 41 at the circuit board's edge to promote less flexing of the circuit board 41.

The invention also discloses a method for securing components in a portable data terminal which is comprised of a series of steps. The steps include providing a portable data terminal 200 with a circuit board 41, an angled frame 2, and a bracket 90. The angled frame 2 is angled and the angle creates and defines an open space 40. The bracket 90 comprises a first beam 100, a second beam 110, a first end member 120, and a second end member 125. The first beam 100 is comprised of a first end 101, a second end 102, an upper contact point 108, and a lower contact point 109. The second beam 110 is spaced from the first beam 100 and is comprised of a first end 111, a second end 112, an upper contact point 118, and a lower contact point 119. The first end member 120 is connected to the first end of the first beam 101 and the first end of the second beam 111 and has an upper contact point 121. The second end member 125 is connected to the second end of the first beam 102 and the second end of the second beam 112 and has an upper contact point 126. Mounting the bracket 90 in the open space 40 with the upper contact points 108, 118, 121, and 126 engaging the angled frame 2 and the lower contact points 109 and 119 engaging the circuit board 41. The bracket 90 enables the portable data terminal 200 with or without an open space 40 to be dropped from a height of five feet without sustaining damages to said portable data terminal (as is required to satisfy the requirements of the testing method MIL STD 810F, Method 516.5, Procedure IV).

The method for securing components in a portable data terminal may further comprise additional steps. The steps include angularly mounting a display 21 onto the angled frame 2 where the angled frame has an interior surface 34 and an exterior surface 38. Mounting the bracket 90 between the angled frame 2 and the circuit board 41 through the open space 40 with the upper contact points 108, 118, 121, and 126 engaging the angled frame 2 and the lower contact points 109 and 119 engaging the circuit board 41. Mounting an antenna 80 to an antenna cavity 50 on the exterior surface 38 of the angled frame. In one embodiment, the antenna is a patch antenna.

The method for securing components in a portable data terminal may further comprise additional steps. The steps include providing a first molded slot 92 connected to the first end member 120 and a second molded slot 94 connected to the second end member 125. Engaging the first molded slot 92 to one of a plurality of solid posts 60 emanating from the angled frame 2 or one of a plurality of hollow posts 62 emanating from the angled frame 2. Engaging the second molded slot 94 to one of a plurality of solid posts 60 emanating from the angled frame 2 or one of a plurality of hollow posts 62 emanating from the angled frame 2. In one embodiment, the hollow posts 62 are threaded.

The method for securing components in a portable data terminal, where the first beam has an upper surface 103, a lower surface 104, an inner surface 105, and an outer surface 106, may further comprise additional steps. The steps include attaching a U-shaped support 140 to the outer surface of the first beam 106 where the U-shaped support has an upper surface 142 and a lower surface 144. Securing a computer chip 4 with the lower surface of the U-shaped support 144 where the computer chip is mounted on a circuit board 41.

The method for securing components in a portable data terminal, where the second beam has an upper surface 113, a lower surface 114, an inner surface 115, and an outer surface 116, may further comprise additional steps. The steps include providing a first notch 150 on the lower surface of the first beam 104 next to the U-shaped support 140. The first notch 150 has a lower surface 151 which is below and substantially parallel to the lower surface of the first beam 104. Attaching a first tab 152 to the outer surface of the first beam 106 which has a lower surface 153 at the same level as the lower surface of the first notch 151. Attaching a second tab 154 to the inner surface of the first beam 105 and the inner surface of the second beam 115 which passes through the bracket opening 96 and is spaced apart from the second end member 125. The second tab 154 has a lower surface 155 at the same level as the lower surface of the first notch 151. Securing a battery 8 which is mounted on a circuit board 41 with the lower surface of the first notch 151, the lower surface of the first tab 153, and the lower surface of the second tab 155.

The method for securing components in a portable data terminal, where the second beam has a second notch 160 on the inner surface of the second beam 115 and a third notch 162 on the outer surface of the second beam 116, may further comprise additional steps. The steps include providing an extension 170 having an extension base 171, an extension tip 172, and an extension opening 173. Connecting the extension 170 at the extension base 171 to the outer surface of the second beam 116. The extension 170 has a fourth notch 180 located between the extension base 171 and the outer surface of the second beam 116, and a fifth notch 182 located a the extension tip 172, where the extension tip has an upper surface 174 and a lower surface 176. Running an antenna lead 82 from the circuit board 41 through the second notch 160, the third notch 162, the fourth notch 180, and the fifth notch 182. Connecting the antenna lead to the antenna 80.

The invention also discloses another method for securing components in a portable data terminal which is comprised of a series of steps. The steps include providing a portable data terminal 200 that comprises a circuit board 41 which supports and interconnects a plurality of electrical components 5, a display 21, an angled frame 2 which maintains the display at an angle to the circuit board and engages a peripheral portion 44 of a first side 42 of the circuit board 41, and a bracket 90 which has an extension 170 to facilitate repeatable routing of a wire/lead 82. The bracket 90 is engaged with the angled frame 2. The bracket 90 is also engaged with the circuit board 41 so as to reduce flexure of the circuit board and secure at least one electrical component 7 on the circuit board 41. Providing an antenna 80, which is a patch antenna. Engaging the antenna 80 to an exterior surface 38 the angled frame. Routing the wire/lead 82 through the bracket 90, the extension 170, and the angled frame 2, between the antenna 80 and the circuit board 41. Connecting the antenna 80 to the circuit board 41 with the wire/lead 82.

The present invention may be embodied in other forms without departing from the spirit and the essential attributes thereof, and, accordingly, reference should be made to the appended claims, rather than to the forgoing specification, as indicated in the scope of the invention.

We claim:

1. A portable data terminal comprising:
   a circuit board supporting and interconnecting a plurality of electrical components;
   a display;
   an angled frame maintaining said display at an angle to said circuit board;
      said angled frame engaging a peripheral portion of a first side of said circuit board; and
   a bracket extending across said angled frame engaging said circuit board so as to reduce flexure of said circuit board and secure at least one electrical component on said circuit board.

2. The portable data terminal, as set forth in claim 1, further comprising:
   an antenna; and
   wherein said antenna is supported by an exterior surface of said angled frame.

3. The portable data terminal, as set forth in claim 2, where said antenna is a patch antenna.

4. The portable data terminal, as set forth in claim 2, wherein said bracket further comprising:
   an extension to facilitate repeatable routing of a wire/lead connecting said antenna to said circuit board.

5. The portable data terminal, as set forth in claim 1, wherein said angled frame further comprising:
   at least one solid post; and
   wherein said bracket slideably engages with said at least one solid post so as to orient said bracket with said angled frame.

6. The portable data terminal, as set forth in claim 1, wherein said at least one electrical component is a battery.

7. The portable data terminal, as set forth in claim 1, wherein said at least one electrical component is a removable printed circuit board.

8. The portable data terminal, as set forth in claim 1, wherein said at least one electrical component is a wireless communication circuit.

9. The portable data terminal, as set forth in claim 1, wherein said angle of said angled frame is in the range of 10 to 20 degrees.

10. The portable data terminal from claim 1, wherein one of said plurality of electrical components is an elongated electrical component; and
    wherein said bracket reduces flexure of said circuit board near said elongated electrical component.

11. A portable data terminal, as set forth in claim 10, wherein said elongated electrical component is a connector.

12. A portable data terminal, as set forth in claim 10, wherein said elongated electrical component is mounted on an opposite side of said circuit board from said bracket.

13. A portable data terminal, as set forth in claim 1, further comprising:
    a frame engaging a peripheral portion of a second side of said circuit board; and
    wherein said bracket biases said circuit board against said frame.

14. A portable data terminal, as set forth in claim 1, wherein said at least one electrical component is at least two electrical components.

15. A portable data terminal comprising:
    a dataform reader;
    a display;
    an antenna;
       said antenna being a patch antenna;
    a circuit board supporting and interconnecting a plurality of electrical components;
    a housing supporting the dataform reader, display and antenna, the housing formed at least partially by top and bottom housing sections, the bottom section having a front surface with an opening utilized by said dataform reader, the bottom section having a front surface that mates with the front surface of the bottom section;
    an angled frame maintaining said display at an angle to said circuit board such that said display is closer to said circuit board at a first end of said angled frame than at a second end of said angled frame, said second end of said angled frame supporting said antenna such that a major plane of the antenna is approximately parallel with the front surface of the top section of the housing.

16. A portable data terminal, as set forth in claim 15, further comprising:
    a bracket extending across said angled frame engaging said circuit board so as to reduce flexure of said circuit board and secure at least one electrical component on said circuit board.

17. The portable data terminal from claim 16, wherein one of said plurality of electrical components is an elongated electrical component; and
    wherein said bracket reduces flexure of said circuit board near said elongated electrical component.

18. A method for routing an antenna wire comprising the steps of:

providing a portable data terminal comprising:

a circuit board supporting and interconnecting a plurality of electrical components;

a display;

an angled frame maintaining said display at an angle to said circuit board;

said angled frame engaging a peripheral portion of a first side of said circuit board; and a bracket having an extension to facilitate repeatable routing of a wire/lead;

engaging said bracket with said angled frame;

engaging said bracket with said circuit board so as to reduce flexure of said circuit board and secure at least one electrical component on said circuit board;

providing an antenna, where said antenna is a patch antenna;

engaging said antenna to an exterior surface said angled frame;

routing said wire/lead through said bracket, said extension, and said angled frame, between said antenna and said circuit board; and connecting said antenna to said circuit board with said wire/lead.

\* \* \* \* \*